Dec. 25, 1923.
1,478,383
H. H. DODGE
LOW PRESSURE GAS BURNER
Original Filed Oct. 21, 1921
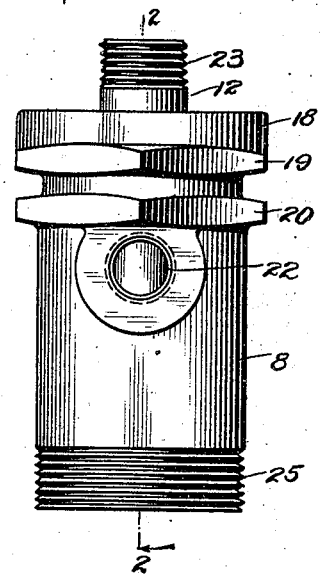
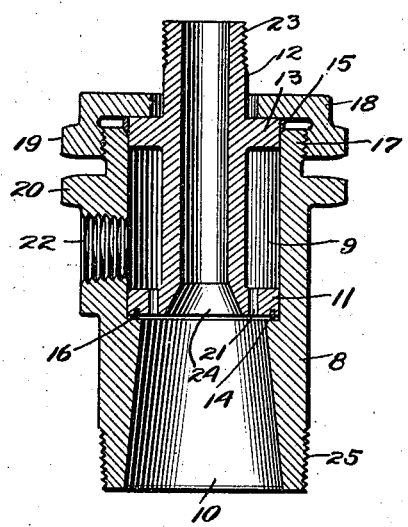
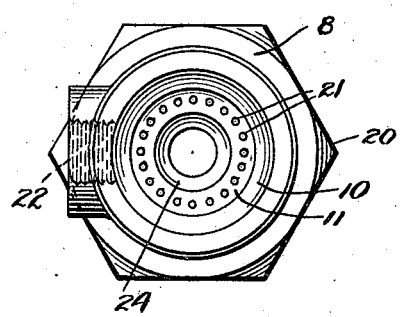
INVENTOR
Harry H. Dodge
BY
ATTORNEY Patented Dec. 25, 1923.

1,478,383

UNITED STATES PATENT OFFICE.

HARRY H. DODGE, OF BUFFALO, NEW YORK.

LOW-PRESSURE GAS BURNER.

Application filed October 21, 1921, Serial No. 509,322. Renewed May 19, 1923.

*To all whom it may concern:*

Be it known that I, HARRY H. DODGE, a citizen of the United States, and a resident of Buffalo, county of Erie, and State of New York, have invented certain new and useful Improvements in Low-Pressure Gas Burners, of which the following is a full, clear, and exact description.

Among the principal objects which the present invention has in view are: to obtain an oxidizing or a non-oxidizing flame at will of the operator; to govern the operating point of the flame; to secure a perfect mixture of air and gas; and to simplify and cheapen the construction.

Drawings.

Figure 1 is a side view of a burner constructed and arranged in accordance with the present invention;

Figure 2 is a longitudinal section thereof, the section being taken on the line 2—2 in Figure 1;

Figure 3 is an end view of the burner.

Description.

As seen in the drawings, the body 8 of the burner is internally bored to form two chambers indicated by the numerals 9 and 10 respectively. The chamber 9 is separated in practice from the chamber 10 by the flange 11 at the end of an air nozzle 12. The rear end of the chamber 10 is closed by a flange 13 formed on the nozzle 12 in correspondence with the flange 11. The joints between the flanges 11 and 13 are rendered gas tight by soft metal gaskets 14 and 15.

The gaskets 14 and 15 slightly differ in shape and in operation. The gasket 14 is preferably a ring rectangular in cross section, which fits an annular groove formed in the face of the flange 11. The edge of the gasket 14 rests on a shoulder 16 at the rear of the chamber 10.

The gasket 15 is wedge shape in cross section to enter a groove formed by internally chamfering the rear edge of the body 8 at the screw-threaded section 17 thereof.

For tightening the cap nut 18 on the body 8, the said cap nut and body are provided with wrench flanges 19 and 20 respectively. By manipulating the nut 18 and body 8 by means of the wrench flanges 19 and 20, the cap of the said nut is forced against the flange 13, and the gasket 15, to move the same forward. The forward movement of the nozzle 12 thus imparted forces the gasket 14 against the shoulder 16, thereby closing the chamber 9 gas tight except for the burner gas openings 21.

The screw threaded passage 22, which opens into the chamber 9, is for the admission of gas to the said chamber. The screw threaded opening is provided to receive in service a gas pipe. A similar function is performed by the screw threaded section 23 on the end of the nozzle 12, for an air pipe which is connected with the said nozzle. The gas which enters the chamber 9 finds egress therefrom by way of the gas openings 21 into the chamber 10.

The nozzle 23 has at the inner end thereof an outwardly flared delivery opening 24, the delivery edge whereof is juxtaposed to the gas openings 21, as will be seen best in Figures 2 and 3 of the drawings.

The gas pipe which is connected at the openings 22 and the air pipe which is connected with the screw threaded portion 23 of the nozzle 12, are both equipped with suitable valves. The said pipes and valves are not shown, being no part of the present invention, and operating in a manner common to such valves. Mention is only made of these elements at the present time for the reason that by manipulating the said valves the air pressure and gas pressure may be independently varied at will. It is obvious that as the gas flows from the chamber 9 to the chamber 10, the air delivered from the nozzle 12 is permitted to expand so as to produce air currents across the path of the gas being emitted from the openings 21. A perfect mixture of the gas and air is thereby insured. It must also be noted that the chamber 10 being outwardly flared, the pressure on the burning mixture thus produced is diminished toward the end of the said chamber. The body of the burner is provided at the delivery end thereof with a screw threaded section 25, whereby the burner may be installed in service.

Claims.

1. A device as characterized comprising an open-ended one piece body member having a cylindrical and a frustoconical section, the diameter of the inner end of the frustoconical section being smaller than the diameter of the cylindrical section to form an annular shoulder at the junction of the two sections; a tubular air nozzle having a plurality of laterally extended flanges, said flanges being spaced apart a distance approximating the length of the cylindrical section of said body, the foremost flange being perforated for introducing gas to the frustoconical section of said body; means for operatively connecting said body and nozzle to hold the forward flange in juxtaposed relation to the shoulder at the junction of said cylinder and frustoconical sections; and means for rendering air and gas tight the joint between said forward flange and said shoulder, said means embodying a gasket and an aligning groove for holding the same.

2. A device as characterized comprising an open-ended one piece body member having a cylindrical and a frustoconical section, the diameter of the inner end of the frustoconical section being smaller than the diameter of the cylindrical section to form an annular shoulder at the junction of the two sections; a tubular air nozzle having a plurality of laterally extended flanges, said flanges being spaced apart a distance approximating the length of the cylindrical section of said body, the foremost flange being perforated for introducing gas to the frustoconical section of said body; and means for operatively connecting said body and nozzle to hold the forward flange in juxtaposed relation to the shoulder at the junction of said cylinder and frustoconical sections, said means embodying a centrally perforated cap nut having screw thread engagement with said body portion to bear upon the rearmost of said flanges.

3. A device as characterized comprising an open-ended tubular body portion having an interior cylindrical section and a frustoconical section, the inner end of said frustoconical section being smaller than the inner diameter of said cylindrical section to form a shoulder therebetween, the ends of said body portion being provided with external screw-threads and the side of said body portion having a screw-threaded opening into the said cylindrical section; a tubular air nozzle having a plurality of spaced apart annular flanges, the diameter of said flanges being the same as the diameter of the cylindrical section of said body portion, the delivery end of nozzle being outwardly flared to juxtaposed relation with relatively small perforations formed in one of said flanges for admitting gas into the frustoconical portion of said body section from the cylindrical portion thereof and from the chamber formed therein by said flanges; and means for holding said nozzle rigidly in service relation to said body portion, said means embodying a cap nut adapted for screw thread engagement with the rear end of said body portion.

4. A device as characterized comprising an open-ended tubular body portion having an interior cylindrical section and a frustoconical section, the inner end of said frustoconical section being smaller than the inner diameter of said cylindrical section to form a shoulder therebetween, the ends of said body portion being provided with external screw-threads and the side of said body portion having a screw-threaded opening into the said cylindrical section; a tubular air nozzle having a plurality of spaced apart annular flanges, the diameter of said flanges being the same as the diameter of the cylindrical section of said body portion, the delivery end of nozzle being outwardly flared to juxtaposed relation with relatively small perforations formed in one of said flanges for admitting gas into the frustoconical portion of said body section from the cylindrical portion thereof and from the chamber formed therein by said flanges; means for holding said nozzle rigidly in service relation to said body, said means embodying a cap nut adapted for screw thread engagement with the rear end of said body portion; and means for installing the device in service, said means embodying a screw-threaded section at the delivery end of said body portion, a screw-threaded section at the receiving end of said nozzle, and a screw-thread in the perforation formed in said body portion entering the chamber formed by the cylindrical section thereof.

5. A device as characterized comprising an open-ended tubular body portion having an interior cylindrical section and a frustoconical section, the inner end of said frustoconical section being smaller than the inner diameter of said cylindrical section to form a shoulder therebetween, the ends of said body portion being provided with external screw-threads and the side of said body portion having a screw-threaded opening into the said cylindrical section; a tubular air nozzle having a plurality of spaced apart annular flanges, the diameter of said flanges being the same as the diameter of the cylindrical section of said body portion, the delivery end of the nozzle being outwardly flared to juxtaposed relation with relatively small perforations formed in one of said flanges for admitting gas into the frustoconical portion of said body section from the cylindrical portion thereof and from the chamber formed therein by said flanges; means for holding said nozzle rigidly in service relation to said body, said means embodying a cap nut adapted for screw thread engagement with the rear end of said body portion; means for installing the device in service, said means embodying a screw-threaded section at the delivery end of said body portion, a screw-threaded section at the receiving end of said nozzle, and a screw-thread in the perforation formed in said body portion entering the chamber formed by the cylindrical section thereof; and means for screwing a gas tight joint from said chamber to the outlet thereof to said frustoconical section, said means embodying a cap nut having a wrench nut formation whereby said body portion may be held while said cap nut is being tightened thereon to force the forward flange of said nozzle into service relation to the shoulder formed between the cylinder and frustoconical sections.

HARRY H. DODGE.